United States Patent
Singh et al.

(10) Patent No.: US 11,868,800 B1
(45) Date of Patent: Jan. 9, 2024

(54) SYSTEM AND METHOD FOR ENHANCING CONTENT COLLABORATION BY CONFLICT DETECTION AND RESOLUTION IN A HYBRID CLOUD CACHE

(71) Applicant: Egnyte, Inc., Mountain View, CA (US)

(72) Inventors: Upendra Singh, Mountain View, CA (US); Ajay Salpekar, Mountain View, CA (US); Bhaskar Guthikonda, Mountain View, CA (US); Andrew Guerra, Mountain View, CA (US); David Tang, Mountain View, CA (US)

(73) Assignee: Egnyte, Inc., Mountain View, CA (US)

(*) Notice: Subject to any disclaimer, the term of this patent is extended or adjusted under 35 U.S.C. 154(b) by 325 days.

(21) Appl. No.: 17/349,471

(22) Filed: Jun. 16, 2021

Related U.S. Application Data

(60) Provisional application No. 63/040,248, filed on Jun. 17, 2020.

(51) Int. Cl.
*G06F 8/65* (2018.01)
*G06F 9/46* (2006.01)
*G06F 8/71* (2018.01)

(52) U.S. Cl.
CPC .............. *G06F 9/467* (2013.01); *G06F 8/65* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 10,366,074 B2* | 7/2019 | Cline | G06F 16/2365 |
| 11,301,489 B2* | 4/2022 | Testardi | G06F 16/27 |
| 2006/0271606 A1* | 11/2006 | Tewksbary | G06F 16/172 |
| | | | 707/999.203 |
| 2013/0226876 A1* | 8/2013 | Gati | G06F 16/184 |
| | | | 707/652 |
| 2016/0098469 A1* | 4/2016 | Allinson | H04L 67/1095 |
| | | | 707/610 |
| 2016/0226972 A1* | 8/2016 | Mahankali | G06F 16/188 |
| 2019/0205429 A1* | 7/2019 | Lee | G06F 16/214 |

\* cited by examiner

*Primary Examiner* — Elias Mamo
(74) *Attorney, Agent, or Firm* — FisherBroyles LLP; Kevin D. Jablonski

(57) ABSTRACT

A system and methods for enhancing content collaboration by conflict detection and resolution. A hybrid cloud cache receives a request from a client to upload an object to the cloud. The hybrid cloud cache may perform an internal lookup to find the latest version of the object known to it. This lookup may return a local identifier or a cloud identifier. The cache may compare a client-provided identifier to the local identifier or to the cloud identifier that is mapped to the local identifier to determine if the client-provided identifier refers to the latest uploaded version of the object. The system may determine that a conflict exists if the client-provided identifier does not match either identifier. The system may generate an alternate name for the object and upload the renamed object to the cloud from the hybrid cloud cache.

17 Claims, 3 Drawing Sheets

SYSTEM AND METHOD FOR ENHANCING CONTENT COLLABORATION BY CONFLICT DETECTION AND RESOLUTION IN A HYBRID CLOUD CACHE

CROSS REFERENCE TO RELATED APPLICATION

This application claims the benefit of U.S. Provisional Application No. 63/040248, titled "System And Method For Enhancing Content Collaboration By Conflict Detection And Resolution In A Hybrid Cloud Cache," filed Jun. 17, 2020, the disclosure of which is incorporated, in its entirety herein, by this reference.

FIELD OF THE DISCLOSURE

The present application relates to cloud technologies, data storage technologies, synchronization technologies, caching technologies, data consistency and integrity technologies, content collaboration technologies, conflict detection and resolution technologies, and more particularly, to a system and method for enhancing content collaboration by conflict detection and resolution in a hybrid cloud cache.

BACKGROUND

Cloud-based file sharing systems may support content collaboration and often include technology to provide conflict detection and resolution. In some use cases or scenarios, Multiversion Content Management Systems and Global File Locking are important and integral components of such systems. This is because to enable collaboration among users (and for other purposes), cloud file sharing systems may maintain multiple versions of a file in the cloud (i.e., stored in a remote cloud-based data storage). One reason for maintaining multiple versions is to have the ability to restore a file from an older version if needed. However, this same feature can be a source of a problem if a user starts an editing session on a stale (i.e., not the most recent) version of a file or continues an editing session on a version that is no longer the most recent version of the file. In this situation, changes to the latest version of the file may be overwritten by a new upload by the user that is based on an older version of the same file. This is referred to herein as a "conflicting upload".

In order to detect this type of conflict, the cloud platform of a cloud file sharing system may perform a version check when receiving a file upload. The cloud system can do this and successfully resolve a conflict because it has information about all of the versions of the file stored in the cloud. However, as will be described, when using a hybrid cloud cache or a system that incorporates such a cache, the ability to detect and resolve a conflicting upload becomes more complicated and subject to error.

A hybrid cloud is a computing architecture that combines an on-premise data center with a public cloud environment. Hybrid cloud caches are local data storage elements used in conjunction with a public cloud-based data storage and serve as an important component of internet applications, as they help achieve improved throughput and increased data access speeds. Conventionally, such caches persist data and metadata regarding operations or transactions on a local file system. The integrity of data stored locally by a hybrid cloud cache may be increased by implementing a journaling system, where a system adds records representing user requested operations and the associated transactions to a journal. Thus, a journaling system may be a data storage location where records are added to represent operations requested by a user or by a computing system at the direction of a user, and the backing store for a journal may comprise disk blocks. Journals may also be referred to as logs and the two terms are often used interchangeably.

When using a journal, user operations and the associated transactions are typically described using as little storage space as possible. At a high level, such operations may be classified into two types or categories of operations. The first type of operation may comprise data operations, which typically involve a local cache being used to upload data or files to, or download data or files from, the cloud system or platform. The second type of operation may comprise metadata operations, which typically involve a local cache being used to perform operations where data itself is not involved. For example, such metadata operations may include, but are not limited to, data or file rename and delete operations.

From the vantage point of a hybrid cloud cache, operations performed through it (i.e., using the local cache as a data storage to receive an upload from a client and to create records of user requested operations and the corresponding transactions) are referred to as Explicit Transactions (or write-through transactions), while operations that are performed directly in the cloud, i.e., around or without use of the cache, are referred to as Implicit Transactions (or write-around transactions). Both Explicit and Implicit transactions can further be classified as data or metadata transactions.

With the evolution of cloud-file-sharing technologies and the tremendous growth of data both in terms of the number of files and the sizes of the files, hybrid cloud caches and systems are becoming an increasingly important aspect of technological and service advancements in the cloud-file-sharing space. Hybrid cloud caches serve as an important component of Internet applications as they may be used to achieve better throughput and increased access speeds. This often results in an improved user experience.

A hybrid cloud cache may be viewed as a partial, but consistent copy of cloud contents that is managed like a file system, but without implementing a full-fledged POSIX (Portable Operating System Interface) compliant file system. A hybrid cloud cache acts as an intermediary between the cloud and its clients (i.e., user devices or user-initiated processes). To prevent data loss and maintain correct control of multiple versions of a file, this architecture requires that a hybrid cloud cache be able to detect and resolve file upload conflicts at its location when used as part of a collaborative environment.

In systems using hybrid cloud caches, detecting conflicts (such as conflicting uploads) presents a challenge because hybrid cloud caches do not include a full Multiversion Content Management System. Instead, hybrid cloud caches typically have a reduced Transient Local Version Management System. Additionally, files may be modified, and new versions may be uploaded to the cloud directly without the hybrid cloud cache having knowledge of the uploads (such as by what are referred to as Implicit Transactions). Further, the version identifiers utilized in such systems are local to a Hybrid Cloud Cache and are not relevant after a file is accepted by the cloud and is assigned a cloud version identifier. This complicates any process designed to identify whether a change made to a locally accessed file is being made to the latest cloud-stored version of the file.

While current technologies and methodologies for using hybrid cloud computing architectures provide benefits and efficiencies, such technologies and methodologies still have disadvantages. One of these disadvantages is in maintaining proper tracking and control of versions of a document or other content in a collaborative environment. Embodiments of the system and methods disclosed herein are directed to overcoming these disadvantages, both individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should he understood by reference to appropriate portions of the entire specification, to any or all figures or drawings, and to each claim.

As will be described, conventional methodologies and technologies used in managing a hybrid cloud computing architecture or other system that includes a hybrid cloud cache may be modified and/or enhanced by using an embodiment of the system, apparatuses, and methods described herein to provide a more optimized caching performance, along with enhanced data consistency and integrity. In some embodiments, this may include providing more effective handling of content versions in a collaborative working environment. Such enhancements and improvements to conventional methodologies and technologies may provide improved efficiency, improved data consistency, improved data integrity, improved speed, improved redundancy, improved long-term and short-term performance, reduced costs, and increased ease-of-use.

A system and accompanying methods for enhancing content collaboration by conflict detection and resolution when using a hybrid cloud cache are disclosed. In some embodiments, when a user uploads a file to the cloud (such as to a cloud-based platform) via a hybrid cloud cache, the hybrid cloud cache may provide a version identifier to the user. The hybrid cloud cache may do so by creating a new Local Version Identifier (LID) and returning the LID to the user. At this stage, the file is not yet persisted (uploaded to and stored) in the cloud and does not have a Cloud Version Identifier (CID). In some embodiments, until the file is "pushed" (i.e., by, execution of a transaction that involves an upload operation) to the cloud and persisted there, the file may be stored in a transient area within the hybrid cloud cache. During this time, the file may be identified internally within the hybrid cloud cache using the LID. A user can continue to access and update this file in the hybrid cloud cache as if the file was stored in cloud, When the file is uploaded to the cloud by the hybrid cloud cache, the cloud creates a corresponding CID.

In some embodiments, the hybrid cloud cache notices the CID returned by the cloud and after that the file may be identified using the CID and the transient LID within the hybrid cloud cache may no longer be used. In some embodiments, a user may make further modifications to the file and send subsequent uploads to the cloud while the file is still in the transient area (where it is identified by a LID) or after it has been pushed to the cloud (where it is identified by a CID).

As suggested, there are multiple situations in which a user may modify a file. These situations may involve different locations of the file during the modification (i.e. in the hybrid cloud cache or in the cloud) and different ways of referencing the file version (i.e., the LID or CID). However, a conflict may result if a user uploads a modification to a stale (i.e., not the most current) file version. In order to prevent data loss and maintain correct control of versions of a file, an effective conflict detection and resolution mechanism is required.

The conflict detection and resolution approach provided by the system and methods described herein is particularly applicable to systems that utilize a hybrid cloud cache. One reason for this is because the hybrid cloud cache is aware of its own created LID and the cloud-created CID when determining if the changes were made to the latest version of a file. In some cases, a user may initiate further upload requests referring to the file version by either the LID or CID, as both may identify the same file version, and this also needs to be taken into account when detecting and resolving conflicts.

The system and methods described provide functionality that enables effective detection of conflicts and resolves detected conflicts in a collaborative situation. In some embodiments, the system and methods may operate as follows:

In a collaborative situation in which multiple users are generating or modifying content, under certain situations it is possible that a user may start an editing session on a stale (not the most recent) version of the file or may continue an editing session on a version that is no longer the most recent version of the file, To prevent data loss and maintain correct control of versions of a file, an embodiment of the conflict detection and resolution process described herein may be used in response to when a user uploads a modification to a version of a file. In such a case:

A process or processes for the detection of a conflict may be conducted;
a the previous version of a file to which changes have been made, and for which an upload request was made is logged into a transaction journal of the hybrid cloud cache accessible to a user (i.e., a transaction corresponding to the requested upload operation is entered into the user's local hybrid cloud cache journal);
the previous version of the file may have a LID or CID, depending on whether the file was still in a transient state within the hybrid cloud cache or whether the file had been pushed to the cloud;
If the file is a transient file (i.e., it is internally identified by a LID), then when the file has been pushed from the hybrid cloud cache to the cloud, the file is assigned a CID from the cloud-based system;
In some embodiments, a mapping between these two version identifiers, LID and CID, is saved internally in the hybrid cloud cache. This mapping enables the hybrid cloud cache to identify which locally-generated LID maps to which cloud-generated CID;
When an upload request for a file (e.g., a document or other content) is received by the hybrid cloud cache from a user or client (where the user may be any person having permission to edit the file), the system and methods may operate to determine whether the user-provided version of the file was the last uploaded version of that file;
- The user-provided version of the file will have an identifier, and this identifier may be a cloud-generated identifier (CID) or a hybrid cloud cache generated identifier (LID).
  - In some embodiments, the hybrid cloud cache may perform an internal lookup to determine the latest file version it is aware of based on the provided identifier;
    - a If the latest version of the file is in a transient state, then the lookup will return a LID. If the latest version of the file has been pushed to the cloud, then the lookup will return a CID;
  - The hybrid cloud cache may first attempt to match the user-provided version identifier to the version identifier the hybrid cloud cache obtained as result of the lookup;
  - If the identifiers match, then there is no conflict because the user-provided version of the file is also the last version of the file known by the hybrid cloud cache;
  - If there is not a match, this may not mean that there is a conflict. This is because the user-provided identifier may be a locally-generated LID, and the file is no longer in a transient state, having already been pushed to the cloud. In this case, the hybrid cloud cache lookup will return a cloud-provided CID;
    - As explained herein, depending on the context, both a LID and CID may refer to the same version of a file (or may not). Therefore, in some embodiments, the hybrid cloud cache refers to the mapping the hybrid cloud cache has stored to determine if both IDs refer to the same version of the file;
    - If such a mapping is found, then this signifies that there is no conflict;
    - Otherwise, the upload request is considered as a conflicting upload and the conflict is resolved using a conflict resolution process, which is described in further detail herein.

Notably, the check or mapping processes conducted by the system and methods ensures that the hybrid cloud cache can detect a conflicting upload if a file was modified by a user directly in the cloud and/or via a different hybrid cloud cache instance than the instance they are presently interacting with. In that situation, the hybrid cloud cache lookup will return the latest CID and the present instance of the hybrid cloud cache would not have a mapping for it, thus indicating a possible conflict. In this situation, persisting the previous version information in the journal as described herein enables the hybrid cloud cache to handle unexpected cache server restart situations during upload of the file to the cloud. This is because as part of journal replay[1], the previous version passed by the user can be read from the journal and used for conflict detection.

[1] Journal Replay refers to a process that runs on system start up and applies the unfinished transactions (user operations acknowledged by a hybrid cache but not fully executed) before a system went down.

As described, in a situation in which multiple users are collaborating on a document or other content and are using systems that include a hybrid cloud cache, there may be occasions in which one user desires to upload a version of the content to the cloud for review and use by others. In that situation, logic executed by the systems and methods described herein may detect a possible conflict. When that occurs, in some embodiments, the system and methods may conduct a process for conflict resolution for a detected or possible conflict by executing the following logic:
- If no conflict is detected, then the system and methods may perform a regular upload to the cloud via the hybrid cloud cache;
- If a conflict is detected, then the system and methods may upload the file with an alternate conflict name;
  - a to do so, the system and methods may operate to have the hybrid cloud cache modify the user-provided file name;
    - in some embodiments, the name of the file may be generated and/or modified by appending the conflict information associated with the detected conflict to the original file name;
      - in some embodiments, the conflict information may include the username and a timestamp;
  - a Once the file is newly named, the file may be stored in a transient area within the hybrid cloud cache;
    - the system and methods may notify the user that requested the upload of the file about the detected conflict and the new name of the file as part of the upload API response;
- the file for which the conflict was detected may then be uploaded from the hybrid cloud cache to the cloud by utilizing the described system and methods.

By ensuring that conflicts are detected and resolved in an efficient and accurate manner, the system and methods described facilitate and enhance content collaboration by ensuring that collaborators are accurately advised of which version of a file they are working on and whether an uploaded version of a file is the latest version of the file.

In one embodiment, a system for enhancing content collaboration by conflict detection and resolution in a hybrid cloud cache is provided. The system may include a memory that stores a set of computer-executable instructions and a processor or processors that execute the instructions. When executed, the instructions cause the processor or processors (or a device or apparatus in which the processor or processors are contained) to perform a set of operations or functions that may include:
- Receiving a request from a client to perform a data operation involving uploading a file to the cloud;
- Associating the requested data operation with a corresponding transaction in a journal of a hybrid cloud cache of the system;
  - a In some cases, this may include creating or writing the transaction in the journal;
- Determining whether a client-provided version identifier of the file refers to the latest uploaded version of the file by comparing the client-provided version identifier to a local version identifier associated with the hybrid cloud cache and/or to a cloud version identifier associated with the cloud that is mapped to the local version identifier;
  - In some cases, the comparison may include accessing a mapping or data structure that includes one or more of a local ID (LID) associated with the cache and a cloud ID (CID) for the version of the file;
- Determining that a conflict associated with the file does not exist if the client-provided version identifier matches either the local version identifier or the cloud version identifier mapped to the local version identifier;
- Determining that a conflict associated with the file does exist if the client-provided version identifier does not match the latest version identifier known to the hybrid cloud cache, which can be either a local version identifier or a cloud version identifier depending on whether the file was not uploaded or uploaded to the cloud;

If the conflict associated with the file does not exist, then the system may upload the file to the cloud as is;

If the conflict associated with the file does exist, then the system may upload the file to the cloud with an alternate conflict name.

In another embodiment, a method for enhancing content collaboration by conflict detection and resolution in a hybrid cloud cache is provided. The method may include one or more of the following stages, steps, operations, or functions:

receiving a request from a client to perform a data operation involving uploading a file to a cloud;

associating the data operation with a transaction in a journal of a hybrid cloud cache of a system;

determining whether a client-provided version identifier of the file refers to the latest uploaded version of the file by comparing the client-provided version identifier to a local version identifier associated with the hybrid cloud cache and/or to a cloud version identifier associated with the cloud that is mapped to the local version identifier;

determining that a conflict associated with the file does not exist if the client-provided previous version identifier matches either the local version identifier or the cloud version identifier mapped to the local version identifier;

determining that a conflict associated with the file does exist if the client-provided version identifier does not match the latest version identifier known to the hybrid cloud cache, which can be either a local version identifier or a cloud version identifier depending on whether the file was not uploaded or was uploaded to the cloud;

if the conflict associated with the file does not exist, then the method may include uploading the file to the cloud as is;

if the conflict associated with the file does exist, then the method may include uploading the file to the cloud with an alternate conflict name.

According to yet another embodiment, a set of computer-executable instructions for enhancing content collaboration by conflict detection and resolution in a hybrid cloud cache is disclosed. The set of computer instructions, when executed by a processor or processors, may cause the processor or processors (or a device or apparatus in which the processor or processors are contained) to perform operations including:

receiving a request from a client to perform a data operation involving uploading a file to a cloud;

associating the data operation with a transaction in a journal of a hybrid cloud cache of the system;

determining whether a client-provided version identifier of the file refers to the latest uploaded version of the file by comparing the client-provided version identifier to a local version identifier associated with the hybrid cloud cache and/or to a cloud version identifier associated with the cloud that is mapped to the local version identifier;

determining that a conflict associated with the file does not exist if the client-provided version identifier matches either the local version identifier or the cloud version identifier;

determining that a conflict associated with the file does exist if the client-provided version identifier does not match the latest version identifier known to the hybrid cloud cache, which can be either a local version identifier or a cloud version identifier depending on whether the file was not uploaded or was uploaded to the cloud;

uploading, if the conflict associated with the file does not exist, the file to the cloud; and uploading, if the conflict associated with the file does exist, the file to the cloud with alternate conflict name.

These and other features of the systems and methods for enhancing content collaboration by conflict detection and resolution in a hybrid cloud cache are described in the following detailed description, drawings, and appended claims. Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

DETAILED DESCRIPTION

Figure 1:
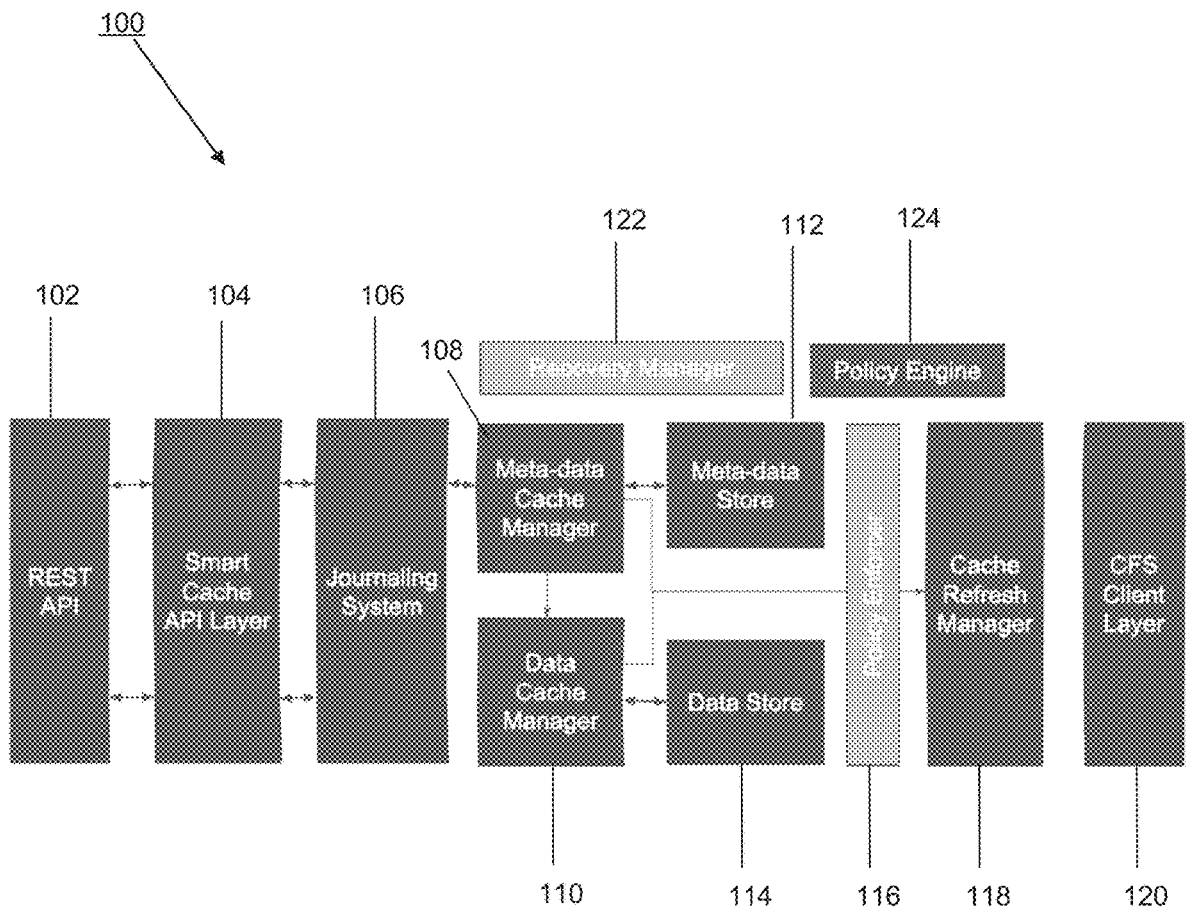
FIG. 1 is a schematic diagram illustrating a system including components for supporting functionality for enhancing content collaboration by conflict detection and resolution in a hybrid cloud cache, in accordance with some embodiments.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform. In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

FIG. 1 is a schematic diagram illustrating a system including components for supporting functionality for enhancing content collaboration by conflict detection and resolution in a hybrid cloud cache, in accordance with some embodiments. The system 100 and accompanying methods for enhancing content collaboration by conflict detection and resolution in a hybrid cloud cache are disclosed. In particular, the system 100 and methods may provide functionality for effective detection of conflicts and resolution of detected conflicts.

In some embodiments, the system 100 and methods may operate as follows:
- the system may initiate and conduct processes for the detection of conflicts associated with uploading files (or other objects) from an instance of a hybrid cloud cache to the cloud;
- to that end, the previous version of a file, to which changes have been made by a user, and for which an upload request was made by the user, is logged into a transaction journal of the hybrid cloud cache;
- the previous version identifier of the file specified by the user may be a local identifier (LID) or a cloud identifier (CID) depending on the version identifier last known to the user;
- when the file is a transient file and the file is pushed from the hybrid cloud cache to the cloud, the system and methods ensure that the file is assigned a CID from the cloud;
- in some embodiments, a mapping between these two version identifiers, LID and CID, may be saved internally in the hybrid cloud cache;
  - in some embodiments, the mapping enables the hybrid cloud cache to identify which locally-generated LID maps to which cloud-generated CID;
- when an upload request is received by the hybrid cloud cache from a user or client, the system and methods are able to determine whether the user-provided version of the file was the last uploaded version of that file;
- a the user-provided version identifier may refer to a cloud-generated version or to a hybrid cloud cache generated local version;
  - in some embodiments, the hybrid cloud cache may perform an internal lookup for the latest file version it is aware of at that time;
    - if the latest version of the file was still in a transient state, then the lookup will return a LID;
    - if the latest version of the file was pushed to the cloud, then the lookup will return a CID;
- the hybrid cloud cache may first compare the user-provided version identifier to the version identifier that the hybrid cloud cache obtained based on the internal lookup;
  - if both identifiers match, then this signifies there is no conflict because the user-provided last version of the file is also the last version of the file known by the hybrid cloud cache;
  - if there is no match, then this may not mean that there is a conflict this is because the user-provided identifier may be a locally-generated LID, however the file is no longer in a transient state and was already pushed to the cloud;
    - in this situation, the hybrid cloud cache lookup will return a cloud-provided CID;
    - as explained herein and depending on the context, both the LID and CID may refer to the same version or they may not refer to the same version;
      - therefore, the hybrid cloud cache refers to the mapping the hybrid cloud cache has stored to determine if both IDs refer to the same version of the file;
      - if a mapping is found, then the system and methods determine that there is no conflict;
      - otherwise, the upload request is considered as a conflicting upload and the conflict is resolved using a conflict resolution process.

The check of the mapping conducted by the system and methods also ensures that the hybrid cloud cache can detect a conflicting upload if the file was modified by a user directly in the cloud and/or via a different hybrid cloud cache instance. For example, in that situation, the hybrid cloud cache lookup will return the latest CID and the present instance of the hybrid cloud cache would not have a mapping for it, thus detecting a conflict. By persisting the previous version information in the cache journal as described, the system and methods are able to handle unexpected cache server restart situations during the upload of the file to the cloud. As part of journal replay, the previous version provided by the user can be read from the journal and used for conflict detection.

If a conflict is detected, then the system 100 and methods may perform a conflict resolution process for the detected conflict as follows:
- if no conflict was detected, then the system and methods may perform a regular upload to the cloud via the hybrid cloud cache, that is the file is uploaded to the cloud as is;
- if a conflict is detected, then the system and methods may upload the file with an alternate conflict name;

as an example, the system and methods may operate to have the hybrid cloud cache modify the user-provided file name;
in some embodiments, the name of the file may be generated and/or modified by appending the conflict information associated with the detected conflict to the original file;
in some embodiments, the information may include the username of the user and a timestamp;
once the file is newly named, the file may be stored in a transient area within the hybrid cloud cache;
the system and methods may include notifying the user that requested the upload of the file about the detected conflict and the new name of the file as part of the upload API response
a then, the file for which the conflict was detected may be uploaded from the hybrid cloud cache to the cloud.

Note that while the hybrid cloud cache maintains its own local version identifiers as the upload to the cloud may be delayed, the hybrid cloud cache may also need to resolve conflicts when either a LID is provided by the client or when a CID is provided. Also, since an actual upload of a file may happen at a later time (i.e., when a transaction corresponding to the upload operation is executed by the cache transaction processing subsystem), the hybrid cloud cache may be detecting and resolving conflicts before the actual upload occurs. Further, the hybrid cloud cache may also need to detect a conflict if a new file version was created directly in the cloud itself or via another hybrid cloud cache instance.

In one sense, conflict detection is based on determining if a client provided version identifier matches with the latest file version known to the system. The client file version identifier provided as part of an upload to a hybrid cloud cache can be a LID or CID. Since only a hybrid cloud cache instance is aware of LIDs and any association between an LID and a CID, the cache itself is required to (in cases where the client provided version identifier is a LID) or preferably able to (in cases where the client provided version identifier is a CID) detect conflicts arising from the upload requests it receives. This is important, because as mentioned, if not detected and resolved by the hybrid cloud cache, a conflict can result in a data loss.

As shown in FIG. 1, a system 100 for enhancing content collaboration by conflict detection and resolution in a hybrid cloud cache is disclosed. The system 100 may be configured to perform some or all the functionality described herein and may be a hybrid cloud cache system. The system 100 may be configured to support, but is not limited to supporting, caching services, hybrid cloud services, cloud services, transaction system services, content collaboration services, error handling services, content delivery services, monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and any other computing applications and services. In some embodiments, the system 100 may be included within another system, may be a separate system from another system, and/or may be a subsystem of another system.

The system 100 may include, but is not limited to including, a REST Application Programming Interface (API) 102 (or other API), a smart cache API layer 104 (or other API layer), a journaling system 106 (may include any number of journals), a metadata cache manager 108, a data cache manager 110, a metadata store 112, a data store 114, a policy enforcer 116, a cache refresh manager 118, a cloud-file-storage (CFS) client layer 120, a recovery manager 122, and a policy engine 124. The system 100 may include a hybrid cloud cache that may utilize the various components of the system 100 and may communicatively link and upload data to and/or download data from a cloud system. The REST API 102 may serve as the interface between user devices and/or other devices and applications supporting the functionality of the system 100. The REST API 102 may be configured to receive API calls from clients (e.g. to access a cache and/or to perform other functions), such as from user devices. The smart cache API layer 104 may serve as an intermediary between the REST API 102 and the journaling system 106 and the other components of the system 100, such as, but not limited to, the cloud-file-storage system and/or other components and/or applications of the system 100.

The journaling system 106 may include one or more journals. One or more of the journals may be configured to record operations (including data and metadata associated with the operations). The metadata may be information that describes the data and/or operations and what is in the data and/or the type of operation. In some embodiments, the journals may be a circular log, buffer, and/or other data structure. In some embodiments, the journals may transfer records storing information associated with the operations to the cloud. Once the records are transferred to the cloud, the records may be deleted or overwritten on the journal(s). The journal(s) may be utilized to ensure that the operations requested by clients are carried out and performed in the event the system 100 crashes or suffers another type of interruption. Data and metadata associated with the operations may be managed by the data cache manager 110 and the metadata cache manager 108 respectively. In certain embodiments, the records including the data and metadata may be stored in the data store 114 and the metadata store 112 respectively.

The system 100 may include a policy enforcer 116, which may be configured to enforce the policies and rules associated with the system 100. The cache refresh manager 118 may be configured to refresh a cache in the system 100, For example, the cache refresh manager 118 may be configured to ensure that data and/or metadata recently stored in a particular cache is current and/or accurate. The system 100 may also include a cloud-file-storage system client layer 120, which may be utilized to facilitate the providing of the records associated with the operations from the journal(s) to a cloud-file-storage system (e.g., a cloud-based platform or system). Additionally, the system 100 may include a recovery manager 122, which may be configured to recover lost data and/or metadata and ensure that the integrity of the data in the journals and/or caches of the system 100 is preserved. The system 100 may further include a policy engine 124, which may be configured to generate and/or conduct various operations associated with policies and/or rules to be utilized with the system 100.

With regards to policy engine 124, examples of policies that may be implemented by the engine include but are not limited to, or required to include the following:
  a) Storage Management policies (e.g., how much disk space should be used by the cache);
  b) Caching policies—what should be cached, what part of cache should be updated and when; and c) Eviction policies—What should be evicted/removed from cache if there is a need to do so.

In some embodiments, one or more policies may be implemented in whole or in part by a rule-base, a trained machine learning model, or other decision process.

Figure 2:
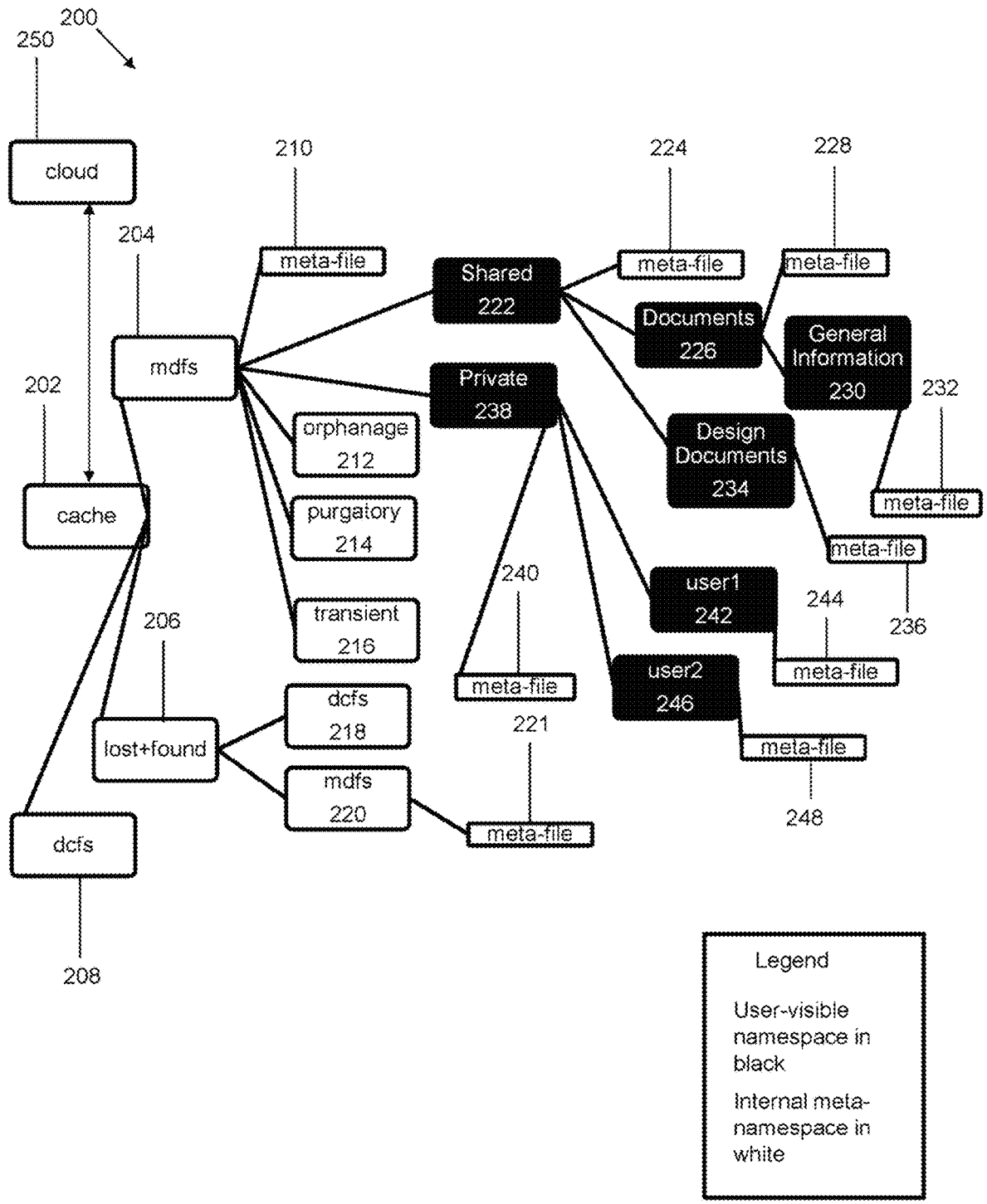
FIG. 2 is a schematic diagram illustrating a system including additional components for supporting the functionality of the system of FIG. 1, in accordance with some embodiments.

Referring now to FIG. 2, which is a schematic diagram illustrating a system including additional components for supporting the functionality of the system of FIG. 1, in accordance with some embodiments. FIG. 2 illustrates an example architecture for a metadata file system 200 for use with the system 100. The system 200 may be configured to perform the functionality described herein and may represent an on-disk structure illustrative of how the hybrid cloud cache system 100 of FIG. 1 stores its data and/or metadata.

The system 200 may include a cache 202 for storing data, files and/or folders, a DCFS (data cache file system) 208 of the cache 202 for storing files and/or data, a MDFS (metadata file system) 204 of the cache 202 for storing metadata (for all objects in the cache, except those in the Lost+Found), a meta-file 210 of the MDFS 204 for storing metadata associated with files and/or data, an orphanage 212 for providing a separate internal meta-namespace for objects that are associated with Implicit metadata transactions, a purgatory 214 for providing a location to which are transferred objects deleted from the cloud, a transient area 216 for data for files not yet transferred to the cloud, a Lost+Found subsystem 206, a DCFS 218 of the Lost+Found subsystem 206, a MDFS 220 of the Lost+Found subsystem 206 (for metadata for the objects in the Lost+Found), a meta-file 221 of the Lost+Found subsystem 206, a shared portion 222, a meta-file 224 of the shared portion 222, documents 226 of the shared portion 222, a meta-file 228 of the documents 226, general information 230, a meta-file 232 of the general information 230, design documents 234, a meta-file 236 of the design documents 234, a private portion 238, a meta-file 240 of the private portion 238, a user1 242, a meta-file 244 associated with the user1 242, a user2 246, a meta-file 248 associated with the user2 246, and a cloud 250 (i.e., a cloud-based platform or data storage).

Folders 222, 226, 230, 234, 238, 242, and 246 are examples of user folders in the namespace. There can be any number of such folders arranged in a hierarchy. The figure shows them as examples to demonstrate that for each user folder a meta-file is created in the hybrid cloud cache which stores the metadata associated with that folder.

It should be noted that the elements, components, or processes illustrated in FIG. 2 as being in the shared portion 222 and in the private portion 238 are designated as such for purposes of an example, and are not intended to be limited to the specific files, documents, and/or other components associated with each shown in FIG. 2. In other examples, the shared portion 222 and/or the private portion 238 may have any number of user-desired folder-hierarchies inside the shared portion 222 and/or the private portion 238.

User1 242 and User2 246 may be humans, computing devices, programs, processes, clients, robots, and/or other types of users, The meta-files 210, 221, 224, 228, 232, 236, 240, 244, and 248 may serve as files that describe data, files and/or folders associated with the corresponding component of the system 200 to which they are connected. In some embodiments, the meta-files 210, 221, 224, 228, 232, 236, 240, 244, and 248 may include attributes, such as, but not limited to, name, size, user, number of versions, upload-time, another attribute, or a combination thereof.

In some embodiments, the white boxes to the left of the black boxes in FIG. 2 may form a part of an internal meta-namespace of the local hybrid cloud cache of the system 100 that is not visible to users/clients. In some embodiments, the black boxes in FIG. 2 may form a part of a user-visible namespace that is visible to users/clients. The Lost+Found subsystem 206 described herein may reside within the internal meta-namespace, which may not be configured to be visible to the users (242 and 246) that may have requested files, folders, and/or data to be uploaded to the cloud.

As an example use case, the system 100 and/or system 200 (which in some embodiments represents the on-disk structure of the hybrid cloud cache of system 100) may operate in the following manner. A user who is collaborating with others on a task may want to upload a file to the cloud 250 via a hybrid cloud cache of the system 100, such as by a user device interacting with the REST API 102 of the system 100. For example, the file to be uploaded may be a text document that a team of people are periodically editing and uploading as new versions of the text document are created. The file may be almost any type of file, such as a movie file, a text document, a media file, a software file, or other type of file. When a user requests to upload the file to the cloud 250 via the hybrid cloud cache, the hybrid cloud cache provides a version identifier to the user. The hybrid cloud cache may do so by creating a new LID and returning it to the user.

At this stage, the text document file may not be persisted in the cloud 250 and does not have a corresponding CID. This is because a file is stored in the cloud only after the hybrid cloud cache pushes (uploads) the file to the cloud. For a successful upload request, the hybrid cloud cache responds to the user with a locally generated LID after the file is persisted in the cache. From the client's point of view, the upload request is complete at this point. This approach provides improved throughput and increased data access speeds. However, in most cases, the hybrid cloud cache pushes the file to the cloud at a later point in time, and it is a successful cloud push that results in the cloud generating a CID.

Until the file is pushed to the cloud 250 and persisted in the cloud, the file may be stored in a transient data area 216 within the hybrid cloud cache. During this time, the file is identified internally within the hybrid cloud cache using the assigned LID, and the user can access and update the file as if it was stored in cloud 250. When the file is uploaded to the cloud 250 by the hybrid cloud cache, the cloud 250 creates its own CID for the file. The hybrid cloud cache saves the CID returned by cloud 250, and from that time onward the file is identified using the CID and the transient LID that had been used within the hybrid cloud cache is no longer used.

A user can make further modifications to the file and send subsequent uploads to the cloud while the file is in the transient area 216 (and being identified by the LID) or after it has been pushed to the cloud 250 (and able to be identified by the CID). This makes detecting and resolving conflicts a somewhat unique challenge in a system that incorporates a hybrid cloud cache because the cache needs to manage its own created LID and the cloud-created CID, while also determining if the user's edits or changes were made to the latest version of the text document or file. Further, the user can generate upload requests that refer to the file version by either a LID or CID, as both may identify the same file version.

In some embodiments, when a request to perform a data operation to upload a version of a file (such as a text document) is received by the hybrid cloud cache from a device of a user (e.g., user 242 or 246 of FIG. 2), the hybrid cloud cache may initiate a process to detect whether a conflict exists between versions of the file. For example, the hybrid cloud cache may determine whether the version of the file (such as a text document) requested to be uploaded is a revision to the latest version of the file that the hybrid cloud cache is aware of or is instead a revision to a prior version of the file. As mentioned, the version of the file to which the changes were made and for which the user has requested an upload may be logged into a transaction journal of the hybrid cloud cache. The version of the file may have a LID or CID assigned to it depending on whether the file was in a transient state and stored in the hybrid cloud cache or whether it was pushed to the cloud 250.

If a previous version of the file was uploaded to the cloud 250 and the file is assigned a CID, then a mapping between the LID and the CID may be stored in the hybrid cloud cache. The mapping enables the hybrid cloud cache to identify the locally-generated LID that corresponds to a particular cloud-generated CID. In some embodiments, when a request to perform a data operation to upload the new version of the file is received from the user, the hybrid cloud cache determines whether the user-provided version identifier corresponds to the last uploaded version of that file. In some embodiments, the user-provided version identifier may refer to either a cloud generated version ID (a CID) or to a hybrid cloud cache generated local version ID (a LID). As an example, the hybrid cloud cache may perform an internal lookup to determine the latest file version it is aware of when the request to upload the new version of the file is received from the user.

If the latest version of file is still in a transient state and stored in the cache, then the lookup will return a LID. However, if the latest version of the file has been pushed to the cloud, then the lookup will return a corresponding CID. In some embodiments, the hybrid cloud cache may first attempt to find a direct match between the user-provided version identifier and the version identifier the hybrid cloud cache determines from the lookup. If the identifiers match, then the system 100, 200 knows that there is no conflict because the user-provided version is the last version known to the hybrid cloud cache. On the other hand, if there is not a match, then it may not mean that there is a conflict, This is because the user-provided identifier may be a locally generated LID, and the file is no longer in the transient state (or in transient area 216) and has been pushed to the cloud 250. In this case, the hybrid cloud cache lookup will return a cloud-provided CID.

As explained herein, both the LID and OD may refer to the same version and in some cases, they may not. To resolve this uncertainty, the hybrid cloud cache refers to the mapping it has stored previously to determine if both refer to the same version of the file. If a mapping between the LID and the CID is found, that indicates there is no conflict.

Figure 3:
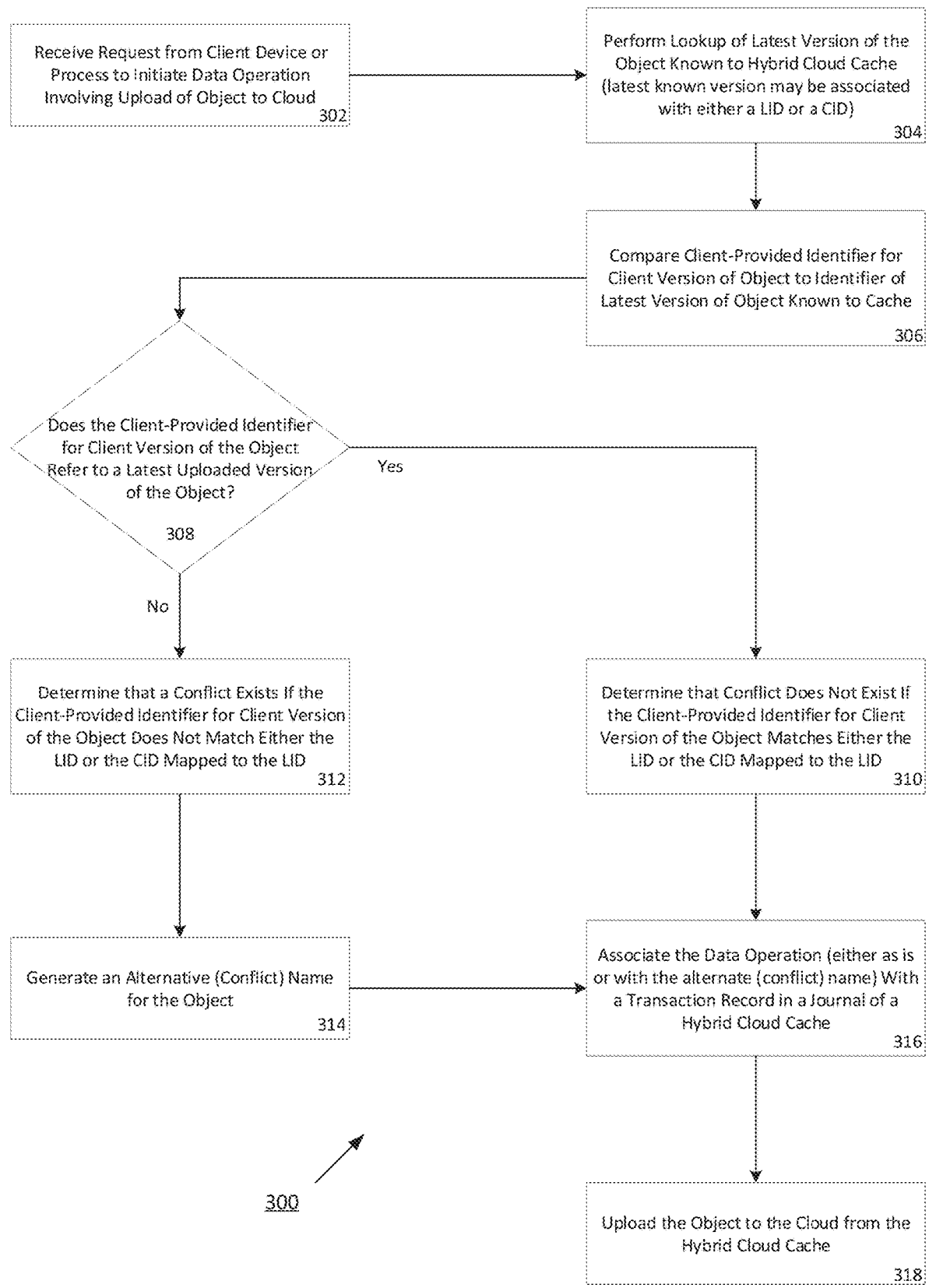
FIG. 3 is a flow chart or flow diagram illustrating an example of a method, process, operation, or function for enhancing content collaboration by conflict detection and resolution in a hybrid cloud cache, in accordance with some embodiments.

Otherwise, the upload request is considered as a conflicting upload and the conflict may be resolved as described herein and with reference to FIG. 3. Checking the mapping in the system also ensures that the hybrid cloud cache can detect a conflicting upload if the file was modified by another user directly in the cloud 250 or via a different instance of the hybrid cloud cache. In such a situation, the hybrid cloud cache lookup will return the latest CID and the current user's instance of the hybrid cloud cache would not have a mapping for it, thus indicating a conflict. Additionally, persisting the previous version information in the cache journal enables the cache to handle unexpected cache server restarts that may occur during the upload of a file; as part of journal replay, the previous version ID provided by the user can be read from the journal and used for conflict detection.

If no conflict is detected, then the file may be uploaded to the cloud 250 via the hybrid cloud cache without modification. However, if a conflict is detected by the hybrid cloud cache, then the file is uploaded with an alternate conflict name. In some embodiments, to generate the alternate name, the hybrid cloud cache may modify the user provided file name by appending conflict information to the original file name. The appended information may include username and a timestamp (e.g., corresponding to when the conflict was detected, or when the upload request was made). The file with the new (alternate) name may be stored in the transient area 216 within the hybrid cloud cache. The hybrid cloud cache may notify the user about the conflict and indicate the new (alternate) name of the file as part of the upload API response. The file may eventually be uploaded to the cloud 250 from the transient area 216 of the hybrid cloud cache.

Combinations of the components, devices, programs, and/or networks of the system 100 and system 200 described herein may execute and/or implement the functionality as described in the method(s) that follow. FIG. 3 is a flow chart or flow diagram illustrating an example of a method, process, operation, or function for enhancing content collaboration by conflict detection and resolution in a hybrid cloud cache, in accordance with some embodiments. In some embodiments, the method 300 may proceed as follows:

At step 302, the method 300 may include receiving a request from a client device or process to initiate one or more data operations, where the data operations involve uploading a file (or another object) to the cloud;
a In some embodiments, the method 300 may include identifying the data operations (or another specific type of operation) in a journal of a hybrid cloud cache by identifying a transaction or transactions corresponding to the requested data operations;

At step 304, the method 300 may include conducting a lookup within the hybrid cloud cache for a record of the latest version of the file (or object) that is known to the hybrid cloud cache;
The latest version of the file known to the cache may have a local version identifier (LID) if the file has not yet been uploaded to the cloud, or it may have a cloud version identifier (CID) if the file has been uploaded to the cloud;
If the file has a cloud version identifier, then the cloud version identifier may be mapped to the local version identifier that previously existed for the file;

At step 306, the method 300 may include comparing a client-provided version identifier to the local version identifier associated with the hybrid cloud cache and/or to the cloud version identifier associated with the cloud obtained via step 304;

At step 308, the method 300 may include determining if the client-provided version identifier of the file (or object) refers to the latest uploaded version of the file (or object) based on the comparison from step 306;
This would occur if the client-provided version identifier of the file matches the CID or if the client-provided version identifier of the file is a LID that is mapped to the OD;

If the determination at step 308 indicates that the client-provided version identifier of the file refers to the latest uploaded version of the file, then the method 300 may proceed to step 310;

At step 310, the method may include determining that a conflict does not exist based on the client-provided version identifier because that identifier matches either the local version identifier or the cloud version identifier mapped to the local version identifier;

The method 300 may then proceed to step 316, which may include associating the requested data operation as is with a transaction record in a journal of the hybrid cloud cache;

This may include creating or writing the transaction in the journal;

At step 318, the method 300 may include uploading the file (or object) from the hybrid cloud cache to the cloud by transferring the file (or object) from a transient area 216 of the hybrid cloud cache to the cloud;

However, if at step 308, it is determined that the client-provided version identifier of the file (or object) does not refer to the latest uploaded version of the file (or object), then the method 300 may proceed to step 312;

At step 312, the method 300 may include determining that a conflict does exist based on the client-provided version identifier not matching either the local version identifier or the cloud version identifier mapped to the local version identifier;

At step 314, the method 300 may include generating an alternate (conflict) name for the file (or object) based on the existence of the conflict;

The alternate conflict name may be generated by appending conflict information to the name of the file (or object);

In some embodiments, the alternate name may include a username of the client/user and/or a timestamp associated with detection of the conflict;

The method 300 may then proceed to step 316, which may include associating the requested data operation having the alternate name with a transaction record in a journal of the hybrid cloud cache;

The method 300 may then proceed to step 318, where the method 300 may include uploading the file (or object) from the hybrid cloud cache to the cloud by transferring the file (or object) with the alternate (conflict) name from a transient area 216 of the hybrid cloud cache to the cloud.

The method 300 may continuously operate as additional transactions are received and/or processed by system 100 or system 200, The method 300 may further incorporate features and functionality described with regards to system 100, system 200, or another method disclosed herein.

As described herein, in some situations a user may start an editing session on a stale (i.e., not the most recent) version of a file or may continue an editing session on a version that is no longer the most recent version of a file. In these situations, and as described herein, when the user attempts to upload a modification to a stale version, a "conflict detection" mechanism is executed and creates a "conflict copy" to prevent data loss and a set of conflict resolution logic is executed.

Each upload results in a new version identifier to represent the uploaded contents. Every upload (except the first) of a file includes the identifier of the version that was modified and is being uploaded. Additionally, the response to the upload includes the identifier of the new version. When a file is uploaded to a hybrid cloud cache, a local version identifier LID is generated by the hybrid cloud cache and is included in the response to the client. In this situation, the cloud is not aware of the LID. When a file is uploaded to the cloud, either by the hybrid cloud cache or directly by the client, a cloud version identifier CID is generated by the cloud and is included in the response to the client or cache. If the upload to Cloud was by a hybrid cloud cache (i.e., a cloud--push), it corresponds to an LID that was included in response to the client. This association of LID and CID is maintained by hybrid cloud cache until no longer needed. If the file was uploaded to the cloud directly by the client, then the hybrid cloud cache eventually becomes aware of the CID (via a refresh of a meta-file), Since the client provided version identifier can be a LID or CID and only the hybrid cloud cache instance is aware of LIDs and any LID to CID association(s), the cache is used to detect conflicts for the upload requests made to it.

As discussed, a file upload conflict refers to the situation where a user tries to upload a file with changes which were not made to the latest version of the file. If this is not detected and resolved by the hybrid cloud cache, this conflict can result in data loss. As an example of a situation in which such a conflict may occur and to illustrate the benefits of the conflict detection and resolution mechanisms described herein, consider the following scenario:

Assume two users U1 and U2 who are editing a file users.doc and uploading the file to a hybrid cloud cache;

First case—without conflict detection capabilities;

Time T1: U1 uploads users.doc with content "My name is U1" to Hybrid Cloud Cache, As this is the first upload, U1 will send an empty version identifier as part of this upload request. The hybrid cloud cache saves this file in a transient area and creates a local version identifier LID1 for this version of the file. It responds back to U1 with LID1. U1 keeps this editing session open. A global File Lock will expire under certain situations, e.g., user logs out, closes the laptop etc.;

Time T2: U2 downloads the file from the hybrid cloud cache. This user will get the latest version identified by LID1, and will see the file content as "My name is U1";

Time T3: Meanwhile, the hybrid cloud cache pushes the file to the cloud. The cloud creates a cloud identifier CID1. for this version and returns it to the hybrid cloud cache. The hybrid cloud cache starts identifying this version of the file with CID1;

Time T4: U2 appends "My name is U2" and uploads the file to the hybrid cloud cache. U2 will send LID1 as the version identifier. The hybrid cloud cache saves this file in the transient area, creates a local version identifier LID2 and responds to U2 with LID2. The file content corresponding to LID2 will be "My name is U1. My name is U2". U2 closes the file and the Global File Lock is released;

Time T5: U1 returns and starts editing the file which was kept open at Since the file was kept open, this user is still referring to the file version identified by LID1 and U1 still sees content as "My name is U1". As an example, this user appends, "U1 lives in Chicago". U1 uploads the file to the hybrid cloud cache. U1 will send version LID1. The hybrid cloud cache creates a local version identifier LID3 for this version of the file and responds to U1 with LID3. The file content corresponding to LID3 will then be "My name is U1. U1 lives in Chicago";

However, in this example, the data added by U2 at T4, i.e., "My name is U2" is lost from the latest version LID3 of the file.

Second case—with conflict detection capabilities;
  In this situation, the outcome of steps performed from time T1 to T4 remains the same. The hybrid cloud cache will detect and resolve the conflict at time T5 as follows to avoid data loss:
  Time T5: as before, U1 returns starts editing the file which was kept open at T1. Since the file was kept open, the user is still referring to the file version identified by LID1 and still sees content as "My name is U1". Assume the user appends, "U1 lives in Chicago". U1 uploads the file to the hybrid cloud cache. U1 will send version LID1;
    The hybrid cloud cache executes the described conflict detection logic. It looks up the latest version of users.doc and gets LID2 which was created as a result of upload from U2 at time T4. It compares the user provided version LID1 with the latest version of the file it is aware of i.e., LID2. The comparison fails and the hybrid cloud cache detects the upload conflict and resolves it to avoid data loss.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover all adaptations or variations of various embodiments and arrangements of the described system and methods. Combinations of the above arrangements, and other arrangements not specifically described herein, will be apparent to those of skill in the art upon reviewing the disclosure. Therefore, it is intended that the disclosure not be limited to the particular arrangement(s) disclosed but to include all embodiments and arrangements falling within the scope of the appended claims.

The foregoing is provided for purposes of illustrating, explaining, and describing embodiments of this disclosure. Modifications and adaptations to these embodiments will be apparent to those skilled in the art and may be made without departing from the scope or spirit of the disclosure. Upon reviewing the embodiments, it would be evident to an artisan with ordinary skill in the art that said embodiments can he modified, reduced, or enhanced without departing from the scope and spirit of the claims described below.

What is claimed is:

1. A system, comprising:
  a memory that stores a set of instructions; and
  a processor or processors that execute the set of instructions, wherein when executed, the set of instructions cause the processor or processors to perform operations comprising:
  receiving a request from a client to initiate an operation to upload an object from a hybrid cloud cache to a cloud-based platform;
  determining whether a version identifier of the object provided by the client corresponds to a latest version of the object uploaded to the cloud-based platform;
  determining that a conflict associated with the object does not exist if the client-provided version identifier corresponds to the latest version of the object uploaded to the cloud-based platform;
  determining that a conflict associated with the object does exist if the client-provided version identifier does not correspond to the latest version of the object uploaded to the cloud-based platform;
  uploading the object to the cloud-based platform if the conflict associated with the object does not exist;
  uploading the object to the cloud-based platform with an alternate name if the conflict associated with the object does exist;
  determining whether the version identifier of the object provided by the client corresponds to the latest version of the object uploaded to the cloud-based platform by comparing a latest version identifier known to the hybrid cloud cache with the client-provided version identifier;
  comparing the latest version identifier known to the hybrid cloud cache with the client-provided version identifier by accessing a data structure from the hybrid cloud cache that includes a mapping between a local identifier for the object assigned by the hybrid cloud caches and a cloud identifier for the object assigned by the cloud-based platform; and
  assigning the cloud identifier to the latest version of the file uploaded to the cache to replace the assigned local identifier, if the latest version of the object uploaded to the cache has been uploaded to the cloud-based platform.

2. The system of claim 1, wherein the set of instructions further comprise instructions which cause the processor or processors to determine that the version identifier of the object provided by the client corresponds to the latest version of the object uploaded to the cloud-based platform by determining that the client-provided version identifier matches either the local identifier for the object assigned by the hybrid cloud cache or the cloud identifier for the object assigned by the cloud-based platform that is mapped to the local identifier for the object.

3. The system of claim 2, wherein the set of instructions further comprise instructions which cause the processor or processors to associate the requested data operation with a corresponding transaction in a journal of the hybrid cloud cache prior to uploading the object to the cloud-based platform.

4. The system of claim 1, wherein the set of instructions further comprise instructions which cause the processor or processors to determine that the version identifier of the object provided by the client does not correspond to the latest version of the object uploaded to the cloud-based platform by determining that the client-provided version identifier does not match either the local identifier for the object assigned by the hybrid cloud cache or the cloud identifier for the object. assigned by the cloud-based platform that is mapped to the local identifier for the object.

5. The system of claim 4, wherein the set of instructions further comprise instructions which cause the processor or processors to generate the alternate name for the object and associate the requested data operation with a corresponding transaction in a journal of the hybrid cloud cache using the alternate name prior to uploading the object to the cloud-based platform.

6. The system of claim 5, wherein the alternate name comprises an original name of the object to which is appended one or more of a username or time stamp.

7. The system of claim 1, wherein the set of instructions further comprise instructions which cause the processor or processors to assign a new local identifier each time an object is uploaded to the hybrid cloud cache.

8. The system of claim 1, wherein the set of instructions further comprise instructions which cause the processor or processors to update the mapping between the local identifier of the object and the cloud identifier of the object if the latest version of the object uploaded to the cache has been uploaded to the cloud-based platform.

9. The system of claim 1, wherein the object is a form of content being worked on by a plurality of users in a collaborative working environment.

10. The system of claim 1, wherein the form of content is one of a document, a video, an image, or a file.

11. A method, comprising:
receiving a request from a client to initiate an operation to upload an object from a data store in a hybrid cloud cache to a data store in a cloud-based platform;
determining whether a version identifier of the object provided by the client corresponds to a latest version of the object uploaded to the cloud-based platform;
determining that a conflict associated with the object does not exist if the client-provided version identifier corresponds to the latest version of the object uploaded to the cloud-based platform;
determining that a conflict associated with the object does exist if the client-provided version identifier does not correspond to the latest version of the object uploaded to the cloud-based platform;
uploading the object to the data store in the cloud-based platform if the conflict associated with the object does not exist; and
uploading the object to the data store in the cloud-based platform with an alternate name if the conflict associated with the object does exist;
wherein generating the alternate name for the object further comprises associating the requested data operation with a corresponding transaction in a journal of the hybrid cloud cache using the alternate name prior to uploading the object to the cloud-based platform, wherein the alternate name comprises an original name of the object to which is appended one or more of a username or time stamp.

12. The method of claim 11, wherein determining whether the version identifier of the object provided by the client corresponds to the latest version of the object uploaded to the cloud-based platform further comprises comparing a latest version identifier known to the hybrid cloud cache with the client-provided version identifier.

13. The method of claim 12, wherein comparing the latest version identifier known to the hybrid cloud cache with the client-provided version identifier further comprises accessing a data structure from the hybrid cloud cache that includes a mapping between a local identifier for the object assigned by the hybrid cloud cache and a cloud identifier for the object assigned by the cloud-based platform.

14. The method of claim 13, wherein determining that the version identifier of the object provided by the client corresponds to the latest version of the object uploaded to the cloud-based platform further comprises determining that the client-provided version identifier matches either the local identifier for the object assigned by the hybrid cloud cache or the cloud identifier for the object assigned by the cloud-based platform that is mapped to the local identifier for the object.

15. The method of claim 11, further comprising generating the alternate name for the object and associating the requested data operation with a corresponding transaction in a journal of the hybrid cloud cache using the alternate name prior to uploading the object to the cloud-based platform, wherein the alternate name comprises an original name of the object to which is appended one or more of a username or time stamp.

16. The method of claim 11, wherein the object is a form of content being worked on by a plurality of users in a collaborative working environment, and the form of content is one of a document, a video, an image, or a file.

17. A set of computer-executable instructions, which when executed by a processor or processors, the set of instructions cause the processor or processors to perform operations comprising:
receiving a request from a client to initiate an operation to upload an object from a data store in a hybrid cloud cache to a data store in a cloud-based platform;
determining whether a version identifier of the object provided by the client corresponds to a latest version of the object uploaded to the cloud-based platform by accessing a data structure from the hybrid cloud cache that includes a mapping between a local identifier for the object assigned by the hybrid cloud cache and a cloud identifier for the object assigned by the cloud-based platform;
determining that a conflict associated with the object does not exist if the client-provided version identifier corresponds to the latest version of the object uploaded to the cloud-based platform;
determining that a conflict associated with the object does exist if the client-provided version identifier does not correspond to the latest version of the object uploaded to the cloud-based platform;
uploading the object to the data store in the cloud-based platform if the conflict associated with the object does not exist;
uploading the object to the data store in the cloud-based platform with an alternate name if the conflict associated with the object does exist;
determining whether the version identifier of the object provided by the client corresponds to the latest version of the object uploaded to the cloud-based platform by comparing a latest version identifier known to the hybrid cloud cache with the client-provided version identifier;
comparing the latest version identifier known to the hybrid cloud cache with the client-provided version identifier by accessing a data structure from the hybrid cloud cache that includes a mapping between a local identifier for the object assigned by the hybrid cloud caches and a cloud identifier for the object assigned by the cloud-based platform; and
assigning the cloud identifier to the latest version of the file uploaded to the cache to replace the assigned local identifier, if the latest version of the object uploaded to the cache has been uploaded to the cloud-based platform.

* * * * *